United States Patent [19]

Wessling et al.

[11] 4,426,470

[45] Jan. 17, 1984

[54] AQUEOUS METHOD OF MAKING REINFORCED COMPOSITE MATERIAL FROM LATEX, SOLID POLYMER AND REINFORCING MATERIAL

[75] Inventors: Ritchie A. Wessling, Midland; Larry D. Yats, Clare, both of Mich.; Darryl K. Tolbert, Tulsa, Okla.

[73] Assignee: The Dow Chemical Company, Midland, Mich.

[21] Appl. No.: 418,934

[22] Filed: Sep. 16, 1982

Related U.S. Application Data

[63] Continuation-in-part of Ser. No. 399,077, Jul. 16, 1982, abandoned, which is a continuation of Ser. No. 286,793, Jul. 27, 1981, abandoned.

[51] Int. Cl.$^3$ .................. C08K 3/40; C08K 7/14; C08L 1/00; B32B 17/08
[52] U.S. Cl. .................. 524/35; 523/334; 524/521; 524/522; 524/527; 524/528; 162/135; 162/146; 162/156; 162/168.1; 162/168.2; 162/168.6; 162/168.7; 162/169; 264/109; 264/128; 264/257; 428/288
[58] Field of Search .......... 260/42.18, 42.46, 17.4 CL, 260/34.2, 29.6 SQ, 29.6 RW, 29.7 UA, 29.7 H; 523/334; 524/35, 501, 522, 521, 525, 527, 528; 162/135, 169, 146, 156, 168.1, 168.2, 168.6, 168.7; 264/109, 128, 257; 428/288

[56] References Cited

U.S. PATENT DOCUMENTS

| 2,650,160 | 8/1953 | Horsley et al. .................. 75/34 |
| 2,772,970 | 12/1956 | Feigley .................. 524/381 |
| 2,906,660 | 9/1959 | Hungerford et al. .................. 162/102 |
| 2,962,415 | 11/1960 | Arledter .................. 162/145 |
| 3,012,929 | 12/1961 | Jackson .................. 162/145 |
| 3,050,427 | 8/1962 | Slayter et al. .................. 264/128 |
| 3,103,461 | 9/1963 | Smith et al. .................. 162/156 |
| 3,184,373 | 5/1965 | Arledter .................. 162/156 |
| 3,271,239 | 9/1966 | Hornbostel, Jr. .................. 162/169 |
| 3,684,645 | 8/1972 | Temple et al. . |
| 3,856,724 | 12/1974 | O'Connor et al. .................. 524/35 |
| 3,950,293 | 4/1976 | Sander et al. .................. 524/522 |
| 4,056,501 | 11/1977 | Gibbs et al. .................. 524/460 |
| 4,147,682 | 4/1979 | Yada et al. .................. 162/164.1 |
| 4,178,206 | 12/1979 | Chakrabarti .................. 162/156 |
| 4,187,142 | 2/1980 | Pickelman et al. .................. 162/146 |
| 4,199,400 | 4/1980 | Bakule et al. .................. 264/109 |
| 4,245,689 | 1/1981 | Grard et al. .................. 162/146 |
| 4,263,184 | 4/1981 | Leo et al. .................. 524/35 |

FOREIGN PATENT DOCUMENTS

| 39292 | 11/1981 | European Pat. Off. . |
| 41-1042552 | 9/1966 | Japan . |
| 52-128406 | 10/1977 | Japan . |
| 2051170 | 1/1981 | United Kingdom . |
| 1263812 | 2/1972 | United Kingdom . |
| WO81/00268 | 7/1980 | PCT Int'l Appl. . |

OTHER PUBLICATIONS

Derwent Abs. 09692J51 Dec. 1982, (EP—67076).

Primary Examiner—John C. Bleutge
Assistant Examiner—Herbert J. Lilling
Attorney, Agent, or Firm—J. S. Boone; S. S. Grace

[57] ABSTRACT

Reinforced polymer composites having a uniform mix of fiber, polymer and binder and having good physical properties are prepared by forming dilute aqueous slurries of a solid heat fusible organic polymer, a reinforcing material and a bound charge latex binder.

26 Claims, No Drawings

AQUEOUS METHOD OF MAKING REINFORCED COMPOSITE MATERIAL FROM LATEX, SOLID POLYMER AND REINFORCING MATERIAL

BACKGROUND OF THE INVENTION

This application is a continuation-in-part of copending application Ser. No. 399,077, filed July 16, 1982, and now abandoned which is a continuation of copending application Ser. No. 286,793, filed July 27, 1981 and now abandoned.

This invention pertains to reinforced polymer composites prepared by an aqueous slurry process.

Reinforced plastics are normally prepared using energy intensive methods such as extrusion and melt mixing. While intimate polymer-fiber association is achieved, the reinforcing fibers often are subject to breakage. Such fiber breakage leads to reduced physical properties. Dry blending is a technique for combining fibers and polymer in which fiber integrity can be maintained but an intimate polymer-fiber association is not achieved resulting in reduced physical properties.

In ordinary paper making, a dilute aqueous slurry comprising fibers, usually cellulosic, is processed in one of two general types of machines, i.e., a Fourdrinier machine or a cylinder machine. In the Fourdrinier, the dilute aqueous dispersion comprising fibers is flowed onto a moving horizontal or inclined wire screen in the form of an endless belt. The water drains from the slurry through the screen usually assisted by suction. The resulting wet mat is removed from the wire by a suction couch roll. Generally, the mat is then wet pressed and then is passed through a series of heated drying cylinders. After being passed through finishing rolls, the dried mat is wound onto reels. In the cylinder machine, the wet sheet is formed by means of a series of cylinders, each being covered with a fine wire screen. The cylinders are revolved in a vat containing the dilute aqueous slurry of fibers. The fibers are deposited on the wire and are picked up by a single felt pressed against the top of each cylinder so that the resulting wet sheet consists of several plies. Thereafter, the process is similar to that with the Fourdrinier.

SUMMARY OF THE INVENTION

This invention provides a process for making reinforced polymer composites which comprises forming a dilute aqueous slurry of a solid, water-insoluble, heat fusible organic polymer, a reinforcing material and a latex binder which contains either anionic or cationic bound charges and flocculating the slurry during agitation with an inorganic or organic flocculant, collecting the solids in the form of a continuous sheet or mat, dewatering and drying.

The invention also provides reinforced polymer composites comprising a solid heat fusible polymer in particulate form, a reinforcing material and the solids of a bound charge latex binder. When prepared by the process of this invention, these composites exhibit a uniform mix of fiber, powder and binder having good physical properties, particularly good wet strength in sheet form. The composites of this invention can be fabricated by conventional methods such as, for example, compression molding, continuous double belt thermal press, stamping and scrapless forming processes. Molded products made according to the invention have similar or better water resistance compared to molded products made from composites which are made from nonaqueous methods. Further, molded products made according to the invention by a scrapless forming process have a very high degree of uniformity of distribution of the reinforcing material compared to other materials made by other processes.

DESCRIPTION OF THE PREFERRED EMBODIMENTS

The process of this invention requires (1) an aqueous medium, (2) a binder, usually at least partially, in the form of a latex which contains either anionic or cationic bound charges, (3) a heat fusible organic polymer which is in the form of a powder or a dispersion, (4) a reinforcement material and (5) a flocculant.

In the process, a dilute aqueous slurry is prepared containing the binder, the heat fusible organic polymer and the reinforcement material, the resulting mixture is flocculated during agitation with a polymeric flocculant opposite in charge to that of the latex binder, the resulting product is uniformly distributed onto a porous support and is allowed to drain to form a wet mat, the wet mat optionally is passed through press rolls and then is dried such as by passing the wet mat through a series of heated drier rolls to obtain a dried mat which optionally is rolled onto a cylinder or collected as a flat sheetstock. The dried mat may then be subjected to various kinds of treatment for the intended use such as compression molding the dried mat into articles.

The latexes required as binders for the practice of this invention are aqueous colloidal dispersions of substantially water-insoluble organic polymers having anionic or cationic bound charges in an amount sufficient to provide stabilization of the colloid, but insufficient to cause the polymer to be water-soluble. Such an amount will usually be from about 0.04 to about 0.60 milliequivalent per gram of polymer. The term "bound to the polymer" with respect to ionic groups or charges, refers to ionic groups or charges which are not desorbable from the polymer by dialysis against deionized water.

By "available" charge is meant the amount of charge an ionizable group would provide to a polymer when fully ionized.

By the term "pH independent groups" as applied to ionic groups is meant that the groups are predominantly in ionized form over a wide range of pH, e.g., 2–12. Representative of such groups are sulfonium, sulfoxonium, isothiouronium, pyridinium, quaternary ammonium groups, sulfate and sulfonate groups.

The essentially water-insoluble organic polymers have a backbone which may be natural or synthetic and may be a homopolymer or a copolymer of two or more ethylenically unsaturated monomers or be derived from such homopolymers or copolymers. Representative organic polymers are natural rubber, the synthetic rubbers such as styrene/butadiene rubbers, isoprene rubbers, butyl rubbers and other rubbery or resinous polymers of unsaturated monomers which are film-forming, preferably at room temperature or below, although in a particular instance a polymer may be used which is film-forming at the temperature of processing. Non-film-forming polymers may be used in blends providing the resulting blend is film-forming. Polymers which are made film-forming by the use of plasticizers may be used. Polymers which are readily available in latex form are preferred, especially hydrophobic polymers which are prepared by emulsion polymerization of one or more ethylenically unsaturated monomers. When in latex form, such polymers advantageously have a particle size of from 500 to 5000 Å and preferably have a particle size of from 800 to 3000 Å as measured by electron microscopy.

Among latexes which can be used in the present invention are those described in U.S. Pat. No. 4,056,501, issued Nov. 1, 1977, to Gibbs et al., incorporated herein by reference. The latexes of Gibbs et al. are cationic structured particle latexes consisting of a water-insoluble, nonionic, organic polymer core encapsulated with a thin layer of a copolymer having chemically-bound pH independent cationic groups wherein the bound cationic charges are at or near the outer surface of the particles. Anionic latexes which may be employed are well known in the art and include such products as carboxylated styrene-butadiene latexes and acrylic latexes which are prepared by emulsion polymerization. The binder is generally employed in an amount sufficient to provide from about 1 to about 10 weight percent by weight, solids basis, of the composite.

Preferred latexes are those which when cast into films and dried have a relatively low water adsorption, and a relatively high wet tensile strength. These preferred latexes have a 24 hour water adsorption value of desirably less than about 20, more desirably less than about 18, preferably less than about 16, and more preferably less than about 14 percent as measured by ASTM D-570-63.

The invention also requires a normally solid, heat fusible organic polymer. By "heat fusible" is meant that the polymer particles are capable of deformation under heat to join into an unitary structure. The heat fusible polymers may be either thermoplastic or thermoset resins. The heat fusible organic polymer component of the present invention is desirably a hydrophobic, water-insoluble addition polymer. These polymers may be in the form of a powder or a dispersion. Suitable heat fusible organic polymers include addition and condensation polymers such as, for example, polyethylene; ultra high molecular weight polyethylene; chlorinated polyethylene; polycarbonates; bipolymers of ethylene and acrylic acid; polypropylene; nylons; phenylene oxide resins; phenylene sulfide resins; polyoxymethylenes; polyesters; terpolymers of acrylonitrile, butadiene and styrene; polyvinylchloride; bipolymers of a major proportion of vinylidene chloride and a minor proportion of at least one other $\alpha,\beta$-ethylenically unsaturated monomer copolymerizable therewith; and styrene homopolymers or copolymers. The polymer powders generally and advantageously have a particle size in the range of 1 to 400 microns. The polymers are generally employed in an amount of from about 19 to about 79 percent by weight of the solids, dry weight basis. A particularly preferred organic polymer is a polyolefin powder in its as-polymerized state when such polymer has been prepared by the process of U.S. Pat. No. 4,323,531. Of course, blends of polymers may be used.

The reinforcement material includes both organic and inorganic products such as graphite, metal fibers, aromatic polyamides, cellulose and polyolefin fibers, but preferably and advantageously comprises glass fibers such as chopped glass strands having a length of $\frac{1}{8}$ to 1 inch (about 3.2 to 25.4 mm) or milled glass fibers which generally have a length of about 1/32 to $\frac{1}{8}$ inch (about 0.79 to 3.2 mm). The glass fibers are advantageously heat cleaned and, to improve impact properties, such fibers may be compatibilized by having a thin coating of, for example, a polyolefin resin or starch thereon. The reinforcing material generally comprises from about 10 to about 80 weight percent of the composite.

As the flocculant (sometimes referred to as a coagulant), any substance capable of destabilizing the latex dispersion may be used. Examples of suitable flocculants include partially hydrolyzed polyacrylamide for cationic systems, and modified cationic polyacrylamide and diallyldiethylammonium chloride for anionic systems.

The composites of the invention may also, optionally, contain a variety of other ingredients. Minor amounts, for example, 10-33 precent by weight, of fillers such as silicon dioxide (Novacite), $CaCO_3$, $MgO$, $CaSiO_3$ (wollastonite) and mica may be incorporated in the composites of this invention, if desired. Pigments or dyes may be added to impart opacity and/or color. Various chemical additives such as antioxidants, UV stabilizers, thickeners, foaming agents, anti-foaming agents, bacteriocides, electromagnetic radiation absorption agents, etc., may also be used.

The composites are formed by blending the latex, the heat fusible polymer, the reinforcing material, and preferably, additional water, then adding the flocculant, dewatering and drying the composite.

This method is conveniently and preferably carried out by first stirring the reinforcing material in water until it is uniformly dispersed. The latex is then slowly added, followed by the gradual addition of the heat fusible polymer, all additions occuring with stirring. Once all ingredients are uniformly dispersed, the flocculant is added in an amount sufficient to bring the system near the isoelectric point. This slurry of water, latex, heat fusible polymer, reinforcing material and flocculant generally has desirably about 0.01 to 5, preferably 0.02 to 0.5 percent solids by weight.

After the flocculation is completed (usually less than one minute), the aqueous slurry is formed into a sheet or web and dewatered. This sheet forming and dewatering process may be accomplished by any conventional papermaking apparatus such as a sheet mold or the aforementioned Fourdrinier or cylinder machines.

After the composite is formed into a dewatered sheet, it may be disirable to densify the sheet by pressing it with a flat press or by sending it through calendering rolls. Densification after drying of the composite is particularly useful for increasing the tensile and tear strength of the composites. Drying of the sheet may be either air drying at ambient conditons or oven drying.

The invention is further illustrated, but is not limited, by the following examples wherein all parts and percentages are by weight unless otherwise specified.

EXAMPLE 1

Reinforced polymer composites are prepared by forming a dilute aqueous dispersion, having 0.5 weight percent solids, by adding the desired amount of reinforcing material to rapidly stirred water, then adding the desired amount of latex while continuing agitation, and incrementally adding the desired heat fusible polymer. Before use, the latex polymers of Sample Nos. 1—1 through 1-6 are postreacted with dimethyl sulfide, as described in U.S. Pat. No. 4,056,501, to provide the desired amount of bound sulfonium charge. When all solids are essentially uniformly dispersed, the flocculant (coagulant) is added in an amount sufficient to bring the system to near the isoelectric point which, in the following examples, is about 0.25 weight percent, with continued agitation. Partially hydrolyzed polyacrylamide is used to flocculate the cationic systems and a modified cationic polyacrylamide is used to flocculate the anionic systems. After flocculation is completed (less than one minute), the aqueous slurry is poured into a sheet mold, air agitated for about 10 seconds, dewatered, wet pressed on blotting paper under a 10 psi (about 69 kPa) pressure and then oven-dried at 100° C., for about 3 hours. The composites are then compression molded in a steam heated press at 180° C. and 30 tons ram pressure and tested for physical properties. Unless otherwise noted, the reinforcing material is ¼ inch (3.2 mm) chopped strand heat cleaned glass fibers, the polymer is high density polyethylene (melt index of 0.3 g/10 seconds) and the weight ratio of solids in the composite is 33/7/60-glass/latex/polymer.

The results are as shown in Table I and Table II and demonstrate the physical properties of composites of the invention.

TABLE 1

Cationic Latex Composites

| Sample Latex | 1-1 55-S/35-B 10-VBC | 1-2 | 1-3 55-S/35-B/10-VBC | 1-4 [1]55-S/35-B/10-VBC | 1-5 44-S/45-B/11-VBC | 1-6 30-MMA/60-BA/90-S/10-VBC |
|---|---|---|---|---|---|---|
| [2]Charge (meq/g) | 0.27 | 0.19 | 0.19 | 0.32 | 0.55 | 0.26 |
| Tg °C. | — | +7 | +7 | −7 | — | — |
| Particle (Å) Size | 1450 | 1430 | 1430 | 1300 | 1100 | 2510 |
| Composite Prop. | | | | | | |
| $E_T$ (psi) | $7.5 \times 10^5$ | $6.5 \times 10^5$ | $8.0 \times 10^5$ | $6.3 \times 10^5$ | $7.0 \times 10^5$ | $6.2 \times 10^5$ |
| $S_T$ (psi) | $6.4 \times 10^3$ | $5.2 \times 10^3$ | $13.7 \times 10^3$ | $4.9 \times 10^3$ | $5.5 \times 10^3$ | $2.2 \times 10^3$ |
| % E | 1.2 | 1.4 | 2.1 | 1.1 | 1.0 | 12.4 |
| HDT (°F.) | 257 | 268 | 270 | 251 | 254 | 216 |
| Notched Izod (ft-lbs/in) | 1.6 | 1.5 | 6.6 | 1.5 | 2.8 | 2.6 |
| $E_F$ (psi) | $4.6 \times 10^5$ | $4.5 \times 10^5$ | $5.5 \times 10^5$ | $5.3 \times 10^5$ | — | $4.8 \times 10^5$ |
| $S_F$ (psi) | $8.2 \times 10^3$ | $7.6 \times 10^3$ | $18.2 \times 10^3$ | $9.3 \times 10^3$ | — | $4.3 \times 10^3$ |

Notes:
[1]Compatibilized glass fibers were employed.
[2]Charge measured by dialysis through cellulose triacetate membrane (A. D. Thomas) against deionized water.
— = Not measured
S = Styrene
B = Butadiene
VBC = Vinylbenzylchloride
MMA = Methylmethacrylate
BA = Butylacrylate
$E_T$ = Tensile Modulus
$S_T$ = Tensile Strength
E = Elongation
HDT = Heat Deflection Temperature (at 264 psi)
$E_F$ = Flexural Modulus
$S_F$ = Flexural Strength

TABLE II

Anionic Latex Composites

| Sample Latex | 2-1 65.55-S/33.2-B/2.5-HEA/1.8-IA | 2-2 50-S/47-B/3-IA | 2-3 [1]62.55-S/33.2-B/2.5-HEA/1.8-IA |
|---|---|---|---|
| Charge (meq/g) | 0.28 | 0.43 | 0.28 |
| Tg °C. | +8 | — | +8 |
| Particle size | 1690 | 1590 | 1690 |
| Composite Prop. | | | |
| $E_T$ (psi) | $6.3 \times 10^5$ | $5.9 \times 10^5$ | $10.4 \times 10^5$ |
| $S_T$ (psi) | $6.0 \times 10^3$ | $3.0 \times 10^3$ | $14.7 \times 10^3$ |
| % E | 1.4 | 4.1 | 2.0 |
| HDT (°F.) | 253 | 239 | 268 |
| Notched Izod impact | 2.0 | 2.0 | 7.8 |
| $E_F$ (psi) | $5.7 \times 10^5$ | $4.0 \times 10^5$ | $6.8 \times 10^5$ |
| $S_F$ (psi) | $10.2 \times 10^3$ | $5.2 \times 10^3$ | $19.0 \times 10^3$ |

| Sample Latex | 2-4 [2]65.55-S/33.2-B/2.5-HEA/1.8-IA | 2-5 [3]62.55-S/33.2-B/2.5-HEA/1.8-IA | 2-6 [4]62.55-S/33.2-B/2.5-HEA/1.8-IA |
|---|---|---|---|
| Charge (meq/g) | 0.28 | 0.28 | 0.28 |
| Tg °C. | +8 | +8 | +8 |
| Particle size | 1690 | 1690 | 1690 |
| Composite Prop. | | | |
| $E_T$ (psi) | $9.6 \times 10^5$ | $8.6 \times 10^5$ | $8.6 \times 10^5$ |
| $S_T$ (psi) | $11.0 \times 10^3$  $12.4 \times 10^3$ | $13.1 \times 10^3$ | |
| % E | 1.7 | 2.2 | 2.1 |
| HDT (°F.) | 252 | 268 | 268 |
| Notched Izod impact | 4.7 | 4.8 | 5.5 |
| $E_F$ (psi) | $5.9 \times 10^5$ | $5.5 \times 10^5$ | $5.3 \times 10^5$ |

TABLE II-continued

| Anionic Latex Composites | | | |
|---|---|---|---|
| $S_F$(psi) | $13.8 \times 10^3$ | $15.1 \times 10^3$ | $15.0 \times 10^3$ |

Notes:
[1]Compatabilized glass fibers were used.
[2]Starch sized glass fibers were used.
[3]Fiber was 28% compatibilized glass fibers and 5% cellulose pulp.
[4]Fiber was 28% compatibilized glass fibers and 5% milled glass.
— = Not measured.
HEA = Hydroxyethylacrylate
IA = Itaconic acid

EXAMPLE 2

23.1 g of 3/16 inch (4.8 mm) chopped strand glass fibers (415BB, available from Owens Corning Fiberglas, Toledo, OH, USA) are added to a vessel containing 7 liters thickened water (Gardner viscosity of about 50 cps), and stirred under high shear for about 5 minutes. Continuing the stirring, 42 g of a high density polyethylene, low bulk density powder made generally according to the teachings of U.S. Pat. No. 4,323,531 and 4.9 g (solids) of a latex (54/45/1 weight parts styrene/butadiene/fumaric acid) are added to the fiberglass dispersion and the mixture is stirred another 2 minutes. Then 30 g (total) of a 0.5 percent aqueous solution of flocculant Betz®1260, available from Betz Laboratories, Trevose, PA, USA is diluted to 0.2 percent solids and added slowly (over about 30 to 60 seconds) to the slurry, and the slurry is then stirred for about 1 minute. The slurry (now about 1 percent solids) is poured into a Williams Sheet mold (8 in.×8 in. (about 203 mm×203 mm)) containing 7 liters of water, mildly agitated, and dewatered. The solids are collected on an 80 mesh screen, wet pressed, and dried in a forced air oven at 105° C. for 90 minutes.

The above procedure is repeated, this time placing about 3 percent of the polyethylene powder into the water when the glass fibers are added.

EXAMPLE 3

The composite sheet produced in Example 2 is pressed by a steam-heated press to form a durable, molded container. The container is strong, impact resistant, and water-resistant.

EXAMPLE 4

Two samples of anionic latex suitable for use in the invention are measured to determine the total charge of the latex. Identical samples are dialyzed against deionized water and measured to determine the remaining charge (bound charge). The results are shown in Table III.

EXAMPLE 5

Samples of the undialyzed latexes of Example 4 and one other latex are cast into films, dried, and placed into deionized water at 23° C. The quantity of water absorbed after 24 hours is measured in accordance with ASTM D-570-63 and a water absorption value is calculated as the percent increase in weight of the films. These results are reported in Table III and shown that latexes best suited for use in the invention have low water absorption values.

TABLE III

| Sample | 3-1 | 3-2 | 3-3 |
|---|---|---|---|
| Polymer Composition[1] | 65.55-S/33.2-B/ 2.5-HEA/1.8-IA | 54.0-S/45.0-B/ 1.0-FA | 87-EA/10-S/ 3-AA |
| Total Charge (meq/g) | 0.29 | 0.21 | —[2] |
| Bound Charge (meq/g) | 0.26 | 0.15 | —[2] |
| Undialyzed Water Absorption (% after 24 hrs) | 13.1 | 13.1 | 20.0 |

Notes:
[1]S = Styrene
B = Butadiene
HEA = 2-Hydroxyethyl acrylate
IA = Itaconic Acid
FA = Fumaric Acid
EA = Ethyl Acrylate
AA = Acrylic Acid
[2]Not measured

EXAMPLE 6

Several layers of the composite sheet of Example 2 are pressed on a steam heated press to form a hard, flat plate. The plate is placed into water at 23° C. The quantity of water absorbed after 24 hours is measured in accordance with ASTM D-570-63 and the water absorption value, calculated as the present increase in the weight of the molded composite, is 0.035 percent. For comparative purposes, a molded plate sold under the trade name of Azdel (PPG Industries, Pittsburg, PA, USA), which is a glass reinforced polypropylene made by a nonaqueous lamination process, is similarly treated. Its water absorption value is 0.094 percent.

EXAMPLE 7

Samples of the flat plates of Example 6 are molded into pie pan shaped containers using a scrapless forming process. The containers are then placed into an oven where the organic material is burnt away. An examination of the glass reinforcing material shows that the reinforcing material in the containers made according to the invention is uniformly distributed within the molded article, but the reinforcing material in the containers made with the Azdel composite is not uniformly distributed, particularly around the outer edges of the container.

What is claimed is:

1. Process for making a composite, which is capable of being heat fused into a reinforced polymer sheet, which comprises
   A. forming a dilute aqueous slurry of
      (1) from about 19 to about 79 percent of solid heat fusible organic polymer particles,
      (2) from about 10 to about 80 percent of a reinforcing material and (3) from about 1 to about 10 percent of a latex binder of a substantially water-insoluble organic polymer having either anionic or cationic bound charges, the percentages being by weight based on a dry solids basis, and B. flocculating the slurry during agitation with a polymeric flocculant opposite in charge to that of the latex binder, C. collecting the solids in the form of a mat, D. dewatering and E. drying.

2. Process of claim 1 wherein the solid fusible organic polymer is polyethylene, ultra high molecular weight polyethylene, chlorinated polyethylene, a bipolymer of ethylene and acrylic acid, polypropylene, polyvinylchloride, a bipolymer of a major proportion of vinylidene chloride and a minor proportion of at least one other $\alpha,\beta$-ethylenically unsaturated monomer copolymerizable therewith, or a styrene homopolymer or copolymer.

3. Process of claim 1 wherein the reinforcing material comprises compatibilized glass fibers.

4. Process of claim 1 wherein the reinforcing material comprises heat cleaned glass fibers.

5. Process of claim 3 or claim 4 wherein the reinforcing material comprises up to 10 percent by weight of milled glass fibers.

6. Process of claim 3 or claim 4 wherein the reinforcing material comprises up to 10 percent by weight of cellulose pulp.

7. Process of claim 1 wherein the latex is an anionic latex.

8. Process of claim 7 wherein the latex is a bound charge anionic styrene-butadiene latex.

9. Process of claim 8 wherein the latex solids contain a copolymerized $\alpha,\beta$-ethylenically unsaturated carboxylic acid.

10. Process of claim 1 wherein the latex is a cationic latex.

11. Process of claim 10 wherein the latex is a bound charge cationic styrene-butadiene latex.

12. Process of claim 1 wherein the dilute aqueous slurry comprises from 0.01 to 5.0 percent by weight solids.

13. Process of claim 1 including the additional step of heat fusing the mat into a reinforced polymer sheet.

14. Process of claim 13 which is a scrapless forming process.

15. Process of claim 13 which is a compression molding process.

16. A composite, in the form of a dried mat, which comprises (a) from about 19 to about 79 percent by weight of a solid heat fusible polymer in particulate form, (b) from about 10 to about 80 percent by weight of a reinforcing material, and (c) from about 1 to about 10 percent by weight of the solids of a substantially water-insoluble organic polymer latex having either anionic or cationic bound charges, which composite is capable of being heat fused into a reinforced polymer sheet.

17. The composite of claim 16 which, when heat fused into a reinforced polymer sheet, is capable of being compression molded without substantial change in the distribution of the reinforcing material.

18. The composite of claim 16 which also contains a polymeric flocculant opposite in charge to that of the latex binder.

19. The composite of claim 18 wherein the flocculant is an acrylamide polymer.

20. The composite of claim 16 wherein the solid heat fusible polymer is polyethylene.

21. The process of claim 1 wherein the dilute aqueous slurry comprises from 0.02 to 0.5 percent by weight solids.

22. Composite of claim 20 wherein the polyethylene powder is polyethylene powder in its as-polymerized state when such polymer has been prepared by organometallic catalysis.

23. Composite of claim 16 wherein the reinforcing material comprises glass fibers.

24. Composite of claim 23 wherein the glass fibers are heat cleaned.

25. Composite of claim 23 wherein the glass fibers are compatibilized.

26. Composite of claim 16 wherein the binder comprises a polymer of styrene, butadiene and an $\alpha,\beta$-ethylenically unsaturated carboxylic acid.

* * * * *

UNITED STATES PATENT AND TRADEMARK OFFICE
CERTIFICATE OF CORRECTION

PATENT NO. : 4,426,470
DATED : January 17, 1984
INVENTOR(S) : Ritchie A. Wessling et al.

It is certified that error appears in the above—identified patent and that said Letters Patent is hereby corrected as shown below:

Col. 4, line 13, "precent" should read --percent--.
line 20, "ete.," should read --etc.,--.
line 44, "disirable" should read --desirable--.

TABLE I bridging Columns 5 and 6, the sub-headings,

"
```
                1-1
Sample  55-S/35-B         1-2                1-3
10-VBC   10-VBC                       55-S/35-B/10-VBC 1-6
       1-4              1-5           30-MMA/60-BA/
 155-S/35-B/10-VBC  44-S/45-B/11-     90-S/10-VBC
                        VBC                                "
``` should read

```
--Sample       1-1                    1-2
  Latex    55-S/35-B/10-VBC     55-S/35-B/10-VBC 1-3                     1-4
      155-S/35-B/10-VBC       44-S/45-B/11-VBC 1-5                     1-6
          90-S/10-VBC         30-MMA/60-BA/10-VBC--
```

UNITED STATES PATENT AND TRADEMARK OFFICE
CERTIFICATE OF CORRECTION

PATENT NO. : 4,426,470

DATED : January 17, 1984

INVENTOR(S) : Ritchie A. Wessling et al.

It is certified that error appears in the above—identified patent and that said Letters Patent is hereby corrected as shown below:

TABLE II bridging Columns 5 and 6, the sub-headings,

"$^{2-1}_{65.55-S/33.2-B/2.5-HEA/1.8-IA}$"  should read

--$^{2-1}_{62.55-S/33.2-B/2.5-HEA/1.8-IA}$--.

"$2^{2-4}_{65.55-S/33.2-B/2.5-HEA/1.8-IA}$"  should read

--$2^{2-4}_{62.55-S/33.2-B/2.5-HEA/1.8-IA}$--.

TABLE II bridging Columns 5 and 6, Samples 2-4, 2-5 and 2-6, <u>Composite Prop.</u> $S_T$(psi), Sample 2-4     "11.0 X $10^3$  12.4 X $10^3$"

Should read   --11.0 X $10^3$--

Sample 2-5     "13.1 X $10^3$"

Should read   --12.4 X $10^3$--

Sample 2-6     "            "

Should read   --13.1 X $10^3$--

UNITED STATES PATENT AND TRADEMARK OFFICE
CERTIFICATE OF CORRECTION

PATENT NO. : 4,426,470
DATED : January 17, 1984
INVENTOR(S) : Ritchie A. Wessling et al.

It is certified that error appears in the above—identified patent and that said Letters Patent is hereby corrected as shown below:

TABLE II-continued bridging Columns 7 and 8, Notes:, "$^1$Compatabilized" should read --$^1$Compatibilized--.

Column 8, line 36, "are pressed on" should read --are pressed in--.

Column 8, line 40, "present increase" should read --percent increase--.

Signed and Sealed this

Twenty-third Day of October 1984

[SEAL]

Attest:

GERALD J. MOSSINGHOFF

Attesting Officer

Commissioner of Patents and Trademarks